United States Patent Office 3,652,624
Patented Mar. 28, 1972

3,652,624
EQUILIBRATED POLYDIORGANOSILOXANYL-SULFATE MIXTURES AND PROCESS FOR THEIR PREPARATION
Gerd Rossmy, Essen-Werden, Germany, assignor to Th. Goldschmidt A.G., Essen, Germany
No Drawing. Filed Jan. 28, 1970, Ser. No. 6,549
Int. Cl. C07f 7/02
U.S. Cl. 260—448.2 N   46 Claims

ABSTRACT OF THE DISCLOSURE

Equilibrated polydiorganosiloxanylsulfate mixtures of the formula

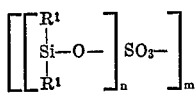

wherein $R^1$ is the same or different in the molecule or molecule mixture and stands for methyl or ethyl; $n$ has a value of from 2 to 20 and $m$ has a value of from 1 to 2. The novel mixtures are useful as water repellents.

The application also discloses procedures for preparing such mixtures.

FIELD OF INVENTION

The invention is concerned with equilibrated polydiorganosiloxanylsulfate mixtures and processes for their preparation.

BACKGROUND INFORMATION AND PRIOR ART

Sulfuric acid derivatives of organo-halosilanes have previously been described in the chemical literature. Such organo-silyl sulfates may be prepared according to different processes. It has thus been proposed to prepare such compounds by the action of sulfuric acid on trimethylchlorosilane according to the following reaction scheme

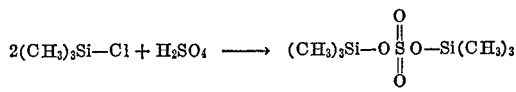

Further, polysiloxanes with intramolecularly bound sulfate groups have been described. Examples for such compounds are disclosed in U.S. Pat. 3,115,512, wherein the polysiloxanes additionally contain halogen or alkoxy groups.

It has been known for a long time that organopolysiloxanes can be equilibrated with sulfuric acid. In attempting to explain the kinetic of the equilibration reaction the occurrence of compounds containing $\equiv$SiOSO$_3$H groups has been assumed. Some researchers have also indulged in the conjecture that the equilibrium reaction results in the formation of intermediate compounds of the formula

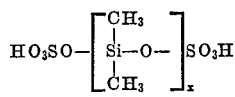

wherein $x$ is a small whole number. However, it has not been possible to demonstrate the existence of these compounds with certainty. Further, it is obvious that such compounds, if they actually are formed, could conceivably be present only in very small amounts in a mixture which contains predominantly sulfuric acid ester-free organo-polysiloxanes. In no instance has it been possible to isolate or recover such compounds.

The subject matter of a co-pending application filed by me Ser. No. 6,547 filed Jan. 28, 1970, is a procedure for the preparation of predominantly linear equilibrated organopolysiloxane mixtures having terminal sulfuric acid groups of the general formula

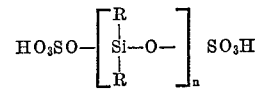

wherein $n=2$ to 20 and R is hydrocarbon which, if desired, may be substituted by a group inert in respect to sulfuric acid. Further, in the mixtures of the co-pending case a portion of the hydrocarbon groups R may be replaced by the group

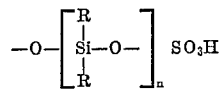

The mixtures are in equilibrium with sulfuric acid and cyclic compounds of the general formula

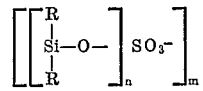

wherein R has the above meaning and $m=1$ to 10, preferably 1 or 2.

If a portion of the R groups of Formula I is replaced by Formula V groups, then, in establishing the equilibrium condition, two of the Formula V groups may condense under sulfuric acid splitting to form the group

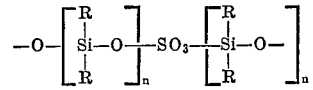

on that side of the equilibrium which contains the free sulfuric acid and the Formula II compounds. This condensation may occur inter- or intramolecularly.

According to the procedure of the co-pending application, an equilibrium mixture is thus obtained. The compounds of the Formula I are in equilibrium with the compounds of the Formula II and with sulfuric acid.

SUMMARY OF THE INVENTION

The purpose and task of the present invention is to obtain the compounds of the general Formula II in isolated pure form and not in equilibrium with other products.

Accordingly, the present invention is directed to a procedure for the preparation of equilibrated mixtures of polydiorganosiloxanylsulfate of the general formula

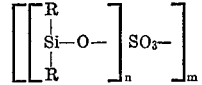

wherein $n=2$ to 20, preferably 2 to 10; $m=1$ to 10, preferably 1 to 2 and R is the same or different and stands for lower alkyl which may be substituted. Preferred alkyl groups are those having 1 to 2 carbon atoms. The alkyl groups may partially be replaced by aromatic groups, preferably phenyl or the group

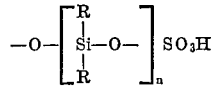

Further, two of the groups R may be replaced intermolecularly or intramolecularly by the group

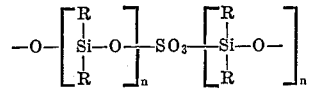

The novel compounds may be prepared by three alternative procedures as follows:

According to the first mode of operation (a) Equilibrated mixtures of compounds of the formula

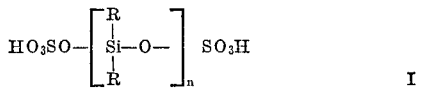

wherein $n$ and R have the above indicated meaning and which are in equilibrium with compounds of the formula

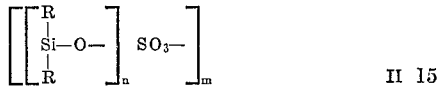

and sulfuric acid are treated so as to separate the sulfuric acid. This is accomplished by the formation of a salt which is soluble with difficulty only or by dissolving the equilibrium mixture in a solvent which does not dissolve sulfuric acid.

According to the second mode of operation (b) Organopolysiloxane comprising structural units of the general formula

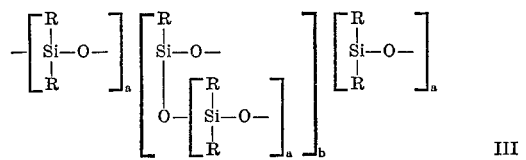

wherein $b=0$ to 20; $a$ being 1 to $10^5$ when $b=0$ and $a=1$ to 20 when $b\geq 1$ and R has the above meaning, are reacted with $10^{-5}$ to 0.5 mole of $SO_3$ or chlorosulfonic acid per silicon atom in the presence of trace amounts of proton acids. The reaction may be carried out at elevated temperatures up to 150° C. If $SO_3$ is used then the $SO_3$ should preferably be added to the siloxane while, by contrast, if chlorosulfonic acid is used the siloxane should preferably be added to the acid and not vice versa.

According to the third mode of operation (c) Organopolysiloxane having terminal silylhalide groups, preferably silylchloride or silylbromide, and corresponding to the general formula

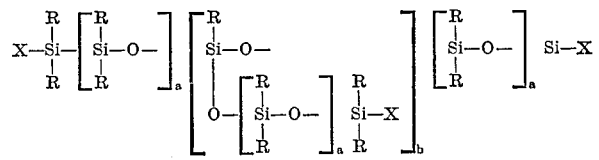

wherein X is halogen, preferably —Cl or —Br, and wherein a portion of the halogen groups may be replaced by sulfate groups, in which event one sulfate group replaces two halogen groups, are reacted with about 0.5 mole of sulfuric acid per silylhalide group. The reaction may be carried out at elevated temperature up to 150° C. and, if desired, under reduced pressure condition.

The compounds obtained according to the three modes of operation (a), (b) or (c) may thereafter be reacted with diorganocyclopolysiloxanes, preferably corresponding to the formula

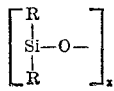

wherein $x=3$ to 7 and R=—CH$_3$ or —C$_2$H$_5$, in the presence of trace amounts of proton acids, preferably in the form of —OSO$_3$H groups.

It should be emphasized that the copounds produced in accordance with the invention are always mixtures of polymerhomologues which are in equilibrium in respect to the molecular weights and the structural distribution.

It has already been stated that the group R may stand for a lower alkyl. The preferred alkyl groups are methyl or ethyl. A portion of the R groups may be replaced by aromatic groups, preferably phenyl. Further, a portion of the R groups may be replaced by the group

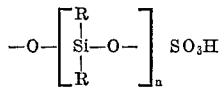

If this is the case then two of these groups may condense so as to form, intermolecularly or intramolecularly, the group.

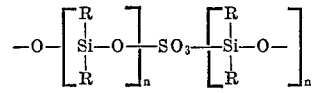

The R groups, moreover, may be substituted. If the R groups are substituted then, of course, the substituents should be of a kind which do not react with sulfuric acid. Examples for such substituted groups are the following:
—(CH$_2$)$_3$OSO$_3$SIR$_3$; —(CH$_2$)$_3$OSO$_3$H; —(CH$_2$)$_3$SO$_3$H; —CH$_2$Br; —(CH$_2$)$_3$Cl; —(CH$_2$)$_2$OR; —(CH$_2$)$_x$R$_f$ (R$_f$=perfluoroalkyl; $x$=whole number); —(CH$_2$)$_3$OR$_f$.

The general formula

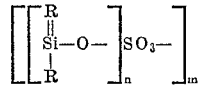

indicates the gross composition of the inventive novel compounds. An example of a possible structure embraced by the gross composition is represented by the following:

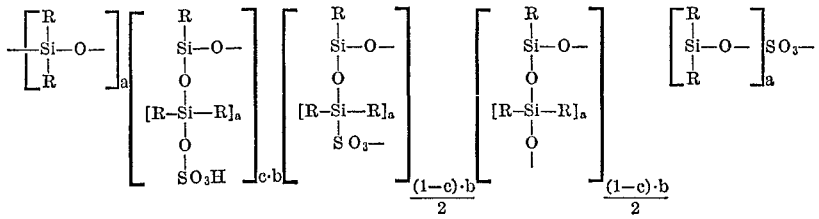

The residual valences become intramolecularly or intermolecularly saturated under formation of silicon-oxygen-sulfur-linkages. The index $b$ has a value of 0 to 20, preferably 0 to 5. If $b=0$ then $a$ has a value of 1 to $10^5$. By contrast if $b\geq 1$ then $a$ has a value of 1 to 20, preferably of 1 to 10. $c$ has a value of 0 to 1.

Other examples of polymer homologous compounds corresponding to the general Formula II may be represented by the following:

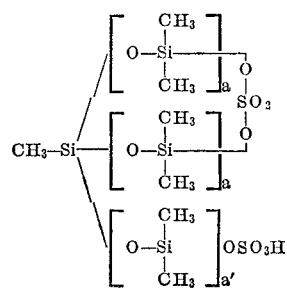

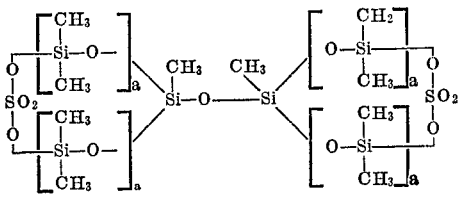

In the two formulae given above, the index $a$ has the above indicated meaning. The index $a'$ is within the range indicated for index $a$; however, $a'$ need not be identical with $a$. $a$ and $a'$ may thus have a value within the range of 1 to 20.

The inventive novel equilibrated mixtures of polydiorganosiloxanylsulfate of the general formula

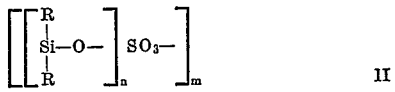    II may be prepared by different procedures as previously indicated.

According to a preferred procedure, indicated as mode of operation (a), equilibrated compound mixtures of the formula

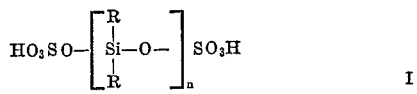    I wherein $n$ and R have the above meaning and which are in equilibrium with compounds of the formula

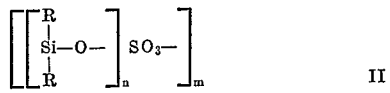    II and sulfuric acid, are treated so as to separate the sulfuric acid. This is accomplished by the formation of a poorly soluble salt or by dissolving the equilibrium mixture in a solvent in which sulfuric acid is not soluble.

The sulfuric acid may thus be removed by the addition of alkaline earth metal hydroxides. However, it is also possible to remove the sulfuric acid from the equilibrium conditions by means of an ion exchanger. A further possibility resides in the dissolution of the equilibrium mixture in an inert solvent which is capable of dissolving the siloxanylsulfates but not the sulfuric acid. The treatment with the solvent may then be effected in several stages. It is also feasible to effect the dissolution, which in fact is a leaching procedure, according to the known counter-current principle wherein the solvent and the mixture to be treated are caused to flow in opposite directions. Suitable solvents for this purpose are, for example, chlorinated hydrocarbons as well as liquid alkanes, as for example, hexane as well as cycloalkanes. Aromatic solvents are less suitable since they have a tendency to react with the sulfuric acid. The sulfuric acid is also capable of removing some water from the equilibrium condition. For this reason the value of $n$ in the Formula II may become somewhat smaller in relation to the value of $n$ in Formula I.

According to a second preferred embodiment, indicated as mode of operation (b) organopolysiloxanes comprising structural units of the general formula

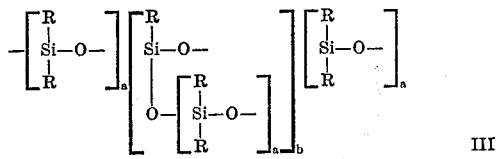    III wherein $b=0$ to 20 and $a=$ to 1 to $10^5$, when $b=0$ and $a=1$ to 20, when $b\geq 1$ and R has the above meaning are reacted with $10^{-5}$ to 0.5 mole of $SO_3$ or chlorosulfonic acid per silicon atom in the presence of trace amounts of proton acids. The reaction, preferably, is carried out with $5 \cdot 10^{-2}$ to 0.5 mole of $SO_3$ or chlorosulfonic acid per silicon atom. Sulfuric acid may be mentioned as an example for a proton acid. The temperature of the reaction is not critical. Generally, the reacting is advantageously carried out at elevated temperatures. However, a temperature of 150° C. should not be exceeded in order to prevent side reactions. A suitable temperature range is, for example, 15 to 70° C.

As compounds comprising structural units of the general Formula III, diorganocyclopolysiloxanes are preferably used, to wit, compounds in which $b=0$ while the residual valences are intramolecularly saturated.

In the embodiment alternative (b), the $SO_3$ is preferably added to the siloxane and not vice versa. By contrast, if chlorosulfonic acid is used then it is recommended to add the siloxane to the chlorosulfonic acid and not vice versa.

According to the third alternative, indicated as mode of operation (c), organopolysiloxanes with terminal silylhalides, preferably silylchloride or silylbromide groups, of the general formula

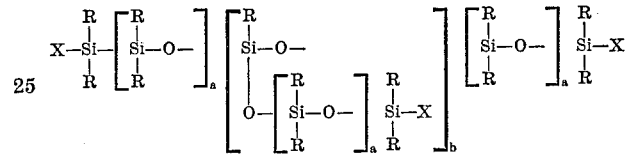

wherein X stands for halogen, preferably chlorine or bromine, and wherein a portion of the halogen groups may be replaced by sulfate (in which event one sulfate group replaces two halogen groups), are reacted with about 0.5 mole of $H_2SO_4$ per silylhalide group. The temperature is again not critical in this reaction. As upper temperature limit a value of 150° C. may be indicated. Above this temperature side reactions may occur and higher temperatures are therefore to be avoided. Although the reaction also proceeds at room temperature, it is recommended to carry out the reaction at elevated temperatures, for example, in a range of 20 to 100° C. in order to facilitate the removal of the hydrogen-halide which is formed. This can be facilitated by pressure reduction and/or by passing an inert gas through the reaction mixture.

The products obtained according to modes of operation (a), (b) or (c) may subsequently be reacted with diorganocyclopolysiloxanes, preferably of the formulae

wherein $x=3$ to 7, $R=$—$CH_3$ or —$C_2H_5$, in the presence of trace amounts of proton acids, preferably in the form of —$OSO_3H$ groups. In this manner an extension of the polysiloxane chain is effected, to wit, the index $n$ or $a$ becomes enlarged by this procedure. The quantity ratio of the diorganocyclopolysiloxane to be incorporated will then be dependent on the desired final value for $n$ and $a$. The cyclopolysiloxane is incorporated into the sulfate group containing siloxane without the employment of additional equilibration catalysts. No particular temperature conditions have to be maintained but the equilibrium reaction proceeds substantially without being influenced by the temperature. Preferably, however, the equilibrium reaction is carried out within temperatures below 150° C. Particularly suitable is a temperature range of 15 to 70° C.

The novel polydiorganosiloxanylsulfate mixtures are exceedingly useful equilibration catalyst for organopolysiloxanes. They may thus, for example, be used for the production of silicone oils and highly viscous organopolysiloxanes with terminal hydroxyl groups. As compared to the known equilibration catalysts, such as sulfuric acid and organosilylsulfate, the inventive novel compounds possess the advantage that they are soluble in the system to be equilibrated and that the equilibration reaction proceeds at such a speed that continuous procedure is rendered possible. The novel compounds permit equilibration reactions which lead to products of higher viscosity.

The cyclic polysiloxanylsulfates of the Formula II wherein $n=2$ to 10 and $m=1$ to 2 have particular importance from a practical point of view. The existence of these substances is most surprising. These compounds are particularly active catalysts for the polymerization of dialkylcyclopolysiloxanes. The presence of small amounts of protons in the reaction mixture is probably necessary. These protons are usually present in the form of small amounts of $OSO_3H$ groups or they can be readily produced by moisture traces.

The inventive novel compounds are also useful as impregnation agents in order to impart certain materials such as glass, ceramics, textiles or paper with water repellent characteristics. An advantage of the inventive compounds is their superior surface adhesion characteristic.

The inventive procedure for the production of the novel compounds will now be described by several examples. These examples, however, are given by way of illustration only and not by way of limitation, and many changes may be effected without affecting in any way the scope and spirit of the invention as recited in the appended claims.

EXAMPLE 1

(A) Preparation of a starting mixture

One mole of $H_2S_2O_7$ is introduced into a three neck flask fitted with stirrer. One mole of octamethylcyclotetrasiloxane is added to the $H_2S_2O_7$ in dropwise manner at 15° C., the temperature being maintained by water cooling. The reaction product formed in this manner, which is obtained without any loss in weight, is only slightly opaque or turbid. No sulfuric acid phase was separated. The viscosity of the product is 276 cp. at 20° C. The acid value, which was determined by hydrolysis, amounted to $8.35 \cdot 10^{-3}$ val. acid per gram substance. The theoretical acid value of the compound

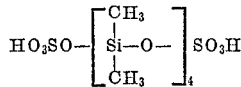

is $8.43 \cdot 10^{-3}$ val. acid per gram substance.

(B) Inventive process 300 g. of the reaction mixture obtained according to (A) above were mixed with twice the amount of dichloromethane. This resulted in the separation of a phase which mainly consisted of sulfuric acid. This phase was separated and discarded. The remaining dichloromethane phase is subjected to evaporation resulting in a residue of 272 g. of a clear, viscous liquid which had an acid value, determined by hydrolysis, of $7.24 \cdot 10^{-3}$ val. acid per gram substance. This corresponds to the formula

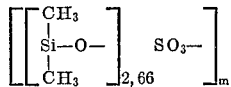

By means of NMR-spectroscopy only traces of protons could be determined.

The constitution of the reaction product, particularly the equilibrium in respect to the polymer distribution, was determined by reaction with methanol-triethylamine. This resulted in the splitting of all SiOS linkages under the formation of $SiOCH_3$ linkages. The substantial occurrence of side reactions could not be observed. The $\alpha,\omega$-dimethylpolydimethylsiloxane obtained in this manner was then distilled at a bath temperature of up to 300° C. and under vacuum up to $10^{-2}$ mm. Hg without leaving any residue. The content of the individual species

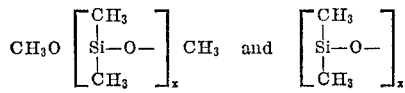

was ascertained in gaschromatographic manner. Table I indicates the areal proportions of the individual linear and cyclic siloxanes in the registration curve of the gaschromatograph:

TABLE I

| | Areal proportion, percent | |
|---|---|---|
| | Linear | Cyclic |
| Number $x$ of Si atoms: | | |
| 1 | 1.26 | |
| 2 | 5.50 | |
| 3 | 19.69 | 1.08 |
| 4 | 18.28 | 3.08 |
| 5 | 16.95 | 0.72 |
| 6 | 11.60 | 0.03 |
| 7 | 8.52 | |
| 8 | 5.07 | |
| 9 | 3.03 | |
| 10 | 1.61 | |
| 11 | 0.70 | |
| 12 | 0.21 | |

The table indicates that the reaction product obtained by the extraction with dichloromethane is an equilibrated mixture of polydiorganosiloxanylsulfates. The potentiometric titration of the reaction product with triethylamine, in which one sulfate group consumes one mole of amine, indicates an equivalent weight of 290, to wit, this is the weight of the product which on the average contains one mole of $SO_3$. The calculated value amounts to 277. A molecular weight of 516 can be determined cryoscopically in benzene. From this an average value of $m=1.86$ can be derived.

EXAMPLE 2

55.3 g. of the dichloromethane extract obtained according to Example 1 were admixed at 20° C. with 29.7 g. of octamethylcyclotetrasiloxane. The mixture thus obtained was agitated for several hours. The clear reaction product thus obtained had an acid value of $4.715 \cdot 10^{-3}$ val. acid per gram substance. This corresponds to an average formula

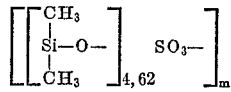

The $\alpha,\omega$-dimethoxypolydimethylsiloxane mixture obtained by reaction with methanol-triethylamine contains only about 2.7% of octamethylcyclotetrasiloxane. This demonstrates that the cyclic siloxane has become incorporated into the diorganosiloxanylsulfate. In respect to the $\alpha,\omega$-dimethoxypolydimethylsiloxane a frequency maximum is gaschromatographically established at 4 silicon atoms. This indicates good conformity with the above formula.

EXAMPLE 3

The reaction product of Example 1 was admixed with 10 mole of octamethylcyclotetrasiloxane per $SO_3$ group. A rapid polymerization of the cyclosiloxane takes place. After 20 minutes a final viscosity of 6680 cp. at 20° C. was obtained.

EXAMPLE 4

Corresponding to the procedure of Example 2, a product of the composition

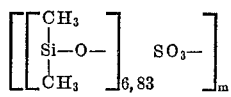

is prepared. The $\alpha,\omega$-dimethoxypolydimethylsiloxane mixture is again obtained by reaction with methanol-triethylamine and the mixture is subjected to gaschromatography. As indicated in the following Table II, the frequency maximum is established at 5 silicon atoms although the distribution curve is substantially broadened.

TABLE II

| Number z of Si atoms: | Areal proportion, percent | |
|---|---|---|
|  | Linear | Cyclic |
| 1 | 0.19 |  |
| 2 | 0.96 |  |
| 3 | 4.33 | 0.48 |
| 4 | 5.91 | 3.30 |
| 5 | 6.14 | 1.97 |
| 6 | 5.68 | 0.46 |
| 7 | 5.08 | 0.08 |
| 8 | 5.06 | 0.04 |
| 9 | 4.60 | 0.14 |
| 10 | 4.27 |  |
| 11 | 2.85 |  |
| 12 and >12 | 48.35 |  |

EXAMPLE 5

(A) Preparation of the starting mixture 400 g. of a siloxane of the formula

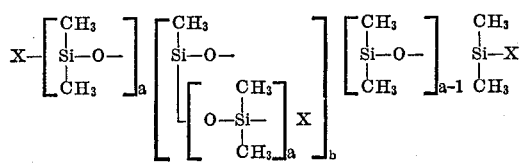

wherein $a=6.17$, $b=3$ and X stands for —Cl or —SO$_4$/2, and whose sulfate content is 54 g. per mole, were agitated with 64 g. of sulfuric acid for one hour at 20° C. whereafter the stirring was continued for 20 hours at 50° C. In the definition of the mole weight the bridging function of the sulfate group is not considered; the group SO$_4$/2 is thus assumed to be a terminal group. Smaller amounts of decan were repeatedly added to the product and the product was subjected to distillation at 70° C. and 9 mm. Hg for the purpose of removing the decan and water. A very viscous mass with an acid value of $3.44 \cdot 10^{-3}$ val. acid per gram substance of which was $0.03 \cdot 10^{-3}$ val. Cl 1 g. was formed.

(B) Inventive process

The product thus obtained was admixed with 800 g. decan. A second phase separated as a result thereof. This second phase consisted mainly of sulfuric acid and was discarded. The solution of the siloxane was adjusted to a concentration of 40% by weight by removing decan by distillation. The acid value of the compound mixture amounted to $0.795 \cdot 10^{-3}$ val. acid per gram substance. Theoretically, an acid value of $0.788 \cdot 10^{-3}$ val. acid per gram substance can be calculated for a compound mixture of the following average formula:

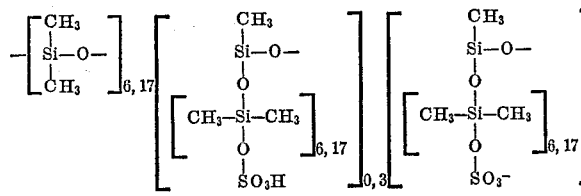

EXAMPLE 6

One mole of chlorosulfonic acid was added to one mole of octamethylcyclotetrasiloxane in dropwise manner. The addition of the acid to the siloxane was effected under stirring and at room temperature. The homogeneous reaction product was briefly heated to 100° C. and subsequently was maintained for two hours at 50° C. under a water jet vacuum. The clear product possessed an acid value of $5.23 \cdot 10^{-3}$ val. acid per gram substance which contained $0.06 \cdot 10^{-3}$ val. Cl per gram. The theoretical acid value of the compound

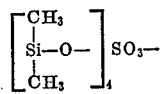

is $5.32 \cdot 10^{-3}$ val. acid per gram substance.

What is claimed is:

1. A process for the preparation of equilibrated mixtures of polydiorganosiloxanylsulfates of the general formula

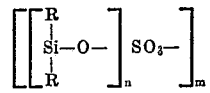

wherein $n=2$ to 20; $m=1$ to 10 and R is the same or different and is selected from the group consisting of lower alkyl, substituted lower alkyl with 1 or 2 carbon atoms aromatic groups, and V, where V is

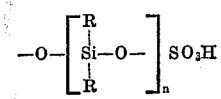

and at least one R stands for lower alkyl or substituted lower alkyl with 1 or 2 carbon atoms, which comprises separating sulfuric acid from equilibrated compound mixtures of formula

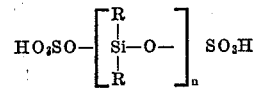   I in which $n$ and R have the above meaning, which compound mixtures are in equilibrium with sulfuric acid and compounds of the formula

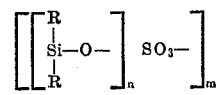   II wherein $n$ and $m$ have the above meaning.

2. A process as claimed in claim 1, wherein the sulfuric acid is separated by forming a poorly soluble salt therewith.

3. A process as claimed in claim 1, wherein the sulfuric acid is separated by dissolving the equilibrium mixture in a solvent in which sulfuric acid is insoluble.

4. A process as claimed in claim 1, wherein $n=2$ to 10, $m=1$ to 2 and R is lower alkyl or substituted lower alkyl with 1 or 2 carbon atoms.

5. A process as claimed in claim 1, wherein a portion of the R groups consists of aromatic groups.

6. A process as claimed in claim 5, wherein said aromatic groups are phenyl.

7. A process as claimed in claim 1, wherein a portion of the groups R consists of the group V.

8. A process as claimed in claim 7, wherein two of the Formula V groups form intermolecularly or intramolecularly the group

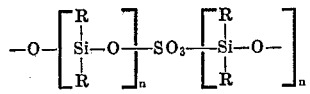

wherein $n$ has the above meaning.

9. A process for the preparation of equilibrated mixtures of polydiorganosiloxanylsulfates of the general formula

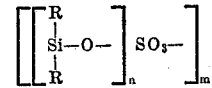

wherein $n=2$ to 20; $m=1$ to 10 and R is the same or different and is selected from the group consisting of lower alkyl, substituted lower alkyl with 1 or 2 carbon atoms, aromatic groups, and V, where V is

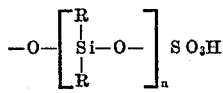

and at least one R stands for lower alkyl or substituted lower alkyl with 1 or 2 carbon atoms, which comprises reacting organopolysiloxanes having structural units of the general formula

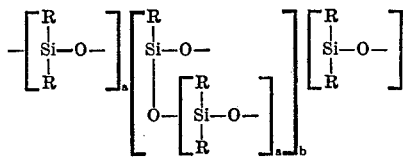

wherein $b=0$ to 20 and $a=1$ to $10^5$ when $b=0$ and $a=1$ to 20 when $b\geq 1$ and R has the above meaning, with $10^{-5}$ to 0.5 mole of $SO_3$ or chlorosulfonic acid per silicon atom, in the presence of trace amounts of proton acids.

10. A process as claimed in claim 9, wherein the reaction is carried out at elevated temperature up to 150° C.

11. A process as claimed in claim 9, wherein the reaction is carried out with $SO_3$, said $SO_3$ being added to said siloxane.

12. A process as claimed in claim 9, wherein the reaction is carried out with chlorosulfonic acid, said siloxane being added to the chlorosulfonic acid.

13. A process as claimed in claim 9, wherein $n=2$ to 10, $m=1$ to 2 and R is lower alkyl or substituted lower alkyl with 1 or 2 carbon atoms.

14. A process as claimed in claim 9, wherein a portion of the R groups consists of aromatic groups.

15. A process as claimed in claim 14, wherein said aromatic groups are phenyl.

16. A process as claimed in claim 9, wherein a portion of the groups R consists of the group V.

17. A process as claimed in claim 16, wherein two of the formula V groups form intermolecularly or intramolecularly the group

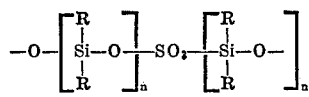

wherein $n$ has the above meaning.

18. A process for the preparation of equilibrated mixtures of polydiorganosiloxanylsulfates of the general formula

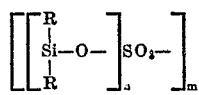

wherein $n=2$ to 20; $m=1$ to 10 and R is the same or different and is selected from the group consisting of lower alkyl, substituted lower alkyl with 1 or 2 carbon atoms, aromatic groups, and V, where V is

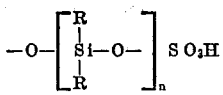

and at least one R stands for lower alkyl or substituted lower alkyl with 1 or 2 carbon atoms, which comprises reacting organopolysiloxanes having terminal silylhalide groups of the general formula

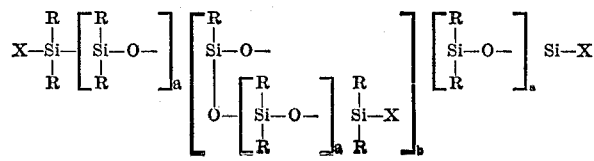

wherein X=halogen, with about 0.5 mole of sulfuric acid per silylhalide group.

19. A process as claimed in claim 18, wherein said terminal silylhalide groups are silylchloride or silylbromide groups.

20. A process as claimed in claim 18, wherein a portion of the X groups is replaced by sulfate, one sulfate group replacing two halogen groups.

21. A process as claimed in claim 18, wherein the reaction is carried out at elevated temperatures not exceeding 150° C. and at reduced pressure.

22. A process as claimed in claim 18, wherein $n=2$ to 10, $m=1$ to 2 and R is lower alkyl or substituted lower alkyl with 1 or 2 carbon atoms.

23. A process as claimed in claim 18, wherein a portion of the R groups consists of aromatic groups.

24. A process as claimed in claim 23, wherein said aromatic groups are phenyl.

25. A process as claimed in claim 18, wherein a portion of the groups R consists of the group V.

26. A process as claimed in claim 25, wherein two of the Formula V groups form intermolecularly or intramolecularly the group

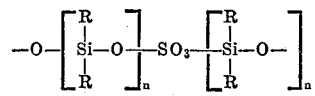

wherein $n$ has the above meaning.

27. A process as claimed in claim 1, wherein the reaction product is subsequently reacted with diorganocyclopolysiloxanes in the presence of trace amounts of proton acids.

28. A process as claimed in claim 27, wherein said diorganocyclopolysiloxane has the formula

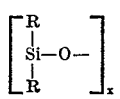

wherein $x=3$ to 7 and R=—$CH_3$ or —$C_2H_5$, said proton acids being in the form of —$OSO_3H$ groups.

29. A process as claimed in claim 9, wherein the reaction product is subsequently reacted with diorganocyclopolysiloxanes in the presence of trace amounts of proton acids.

30. A process as claimed in claim 29, wherein said diorganocyclopolysiloxane has the formula

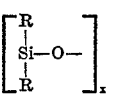

wherein $x=3$ to 7 and R=—$CH_3$ or —$C_2H_5$, said proton acids being in the form of —$OSO_3H$ groups.

31. A process as claimed in claim 18, wherein the reaction product is subsequently reacted with diorganocyclopolysiloxanes in the presence of trace amounts of proton acids.

32. A process as claimed in claim 31, wherein said diorganocyclopolysiloxane has the formula

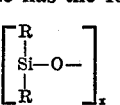

wherein $x=3$ to 7 and R=—$CH_3$ or —$C_2H_5$, said proton acids being in the form of —$OSO_3H$ groups.

33. A process as claimed in claim 3, wherein said solvent is dichloromethane.

34. A process as claimed in claim 9, wherein the residual valences of said organopolysiloxanes of Formula III are intramolecularly saturated.

35. A process as claimed in claim 9, wherein the index $a$ of said organopolysiloxanes of Formula III is 1.3 to 5 and $b=0$.

36. A process as claimed in claim 9, wherein said organopolysiloxanes of Formula III are reacted with $5 \cdot 10^{-2}$ to 0.5 mole of $SO_3$ or chlorosulfonic acid per silicon atom.

37. A process as claimed in claim 9, wherein the reaction is carried out in a temperature range of about 15 to 70° C.

38. A process as claimed in claim 18, wherein the reaction is carried out in a temperature range of about 20 to 100° C.

39. A process as claimed in claim 18, wherein liberated hydrogen halide is removed by pressure reduction and/or by passing an inert gas through the reaction mixture.

40. A process as claimed in claim 1, wherein the reaction product is subsequently reacted with dialkylcyclopolysiloxanes at temperatures of about 15 to 70° C.

41. A process as claimed in claim 9, wherein the reaction product is subsequently reacted with dialkylcyclopolysiloxanes at temperatures of about 15 to 70° C.

42. A process as claimed in claim 18, wherein the reaction product is subsequently reacted with dialkylcyclopolysiloxanes at temperatures of about 15 to 70° C.

43. Equilibrated polydiorganosiloxanylsulfate mixtures of the general formula

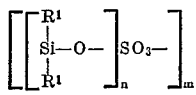

wherein $R^1$ is the same or different in the molecule or in the molecule mixture and stands for methyl or ethyl, $n$ having a value of from 2 to 10 and $m$ having a value of from 1 to 2.

44. Polydiorganosiloxanylsulfate mixtures according to claim 43, wherein $n$ has a value of from 2 to 6.

45. Polydiorganosiloxanylsulfate mixtures of the general formula

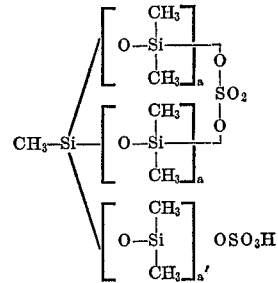

wherein $a$ and $a'$ are the same or different and each has a value of from 1 to 20.

46. Polydiorganosiloxanylsulfate mixtures of the general formula

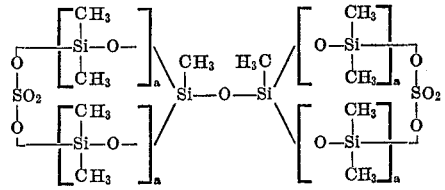

wherein $a$ has a value of from 1 to 20.

References Cited

UNITED STATES PATENTS

| | | | |
|---|---|---|---|
| 3,115,512 | 12/1963 | Rossmy et al. | 260—448.8 R |
| 3,412,129 | 11/1968 | Holdstock | 260—448.2 N |

DELBERT E. GANTZ, Primary Examiner

P. F. SHAVER, Assistant Examiner

U.S. Cl. X.R.

106—13; 117—124 F, 154; 260—448.2 B